(12) United States Patent
Lin et al.

(10) Patent No.: US 11,809,027 B2
(45) Date of Patent: Nov. 7, 2023

(54) PANCAKES LENS ASSEMBLY (71) Applicant: NATIONAL YANG MING CHIAO TUNG UNIVERSITY

(72) Inventors: Yi-Hsin Lin, Taiwan (TW); Ting-Wei Huang, Chiayi County (TW); Yu-Jen Wang, Taipei (TW)

(73) Assignee: NATIONAL YANG MING CHIAO TUNG UNIVERSITY, Hsinchu (TW)

(*) Notice: Subject to any disclaimer, the term of this patent is extended or adjusted under 35 U.S.C. 154(b) by 0 days.

(21) Appl. No.: 17/739,788

(22) Filed: May 9, 2022

(65) Prior Publication Data
US 2023/0236445 A1 Jul. 27, 2023

(30) Foreign Application Priority Data

Jan. 27, 2022 (TW) .................. 111103681

(51) Int. Cl.
| | |
|---|---|
| *G02F 1/01* | (2006.01) |
| *G02B 5/30* | (2006.01) |
| *G02B 3/00* | (2006.01) |
| *G02B 3/12* | (2006.01) |
| *G02F 1/139* | (2006.01) |

(52) U.S. Cl.
CPC ......... *G02F 1/0136* (2013.01); *G02B 3/0087* (2013.01); *G02B 3/12* (2013.01); *G02B 5/3016* (2013.01); *G02B 5/3025* (2013.01); *G02B 5/3083* (2013.01); *G02F 1/1396* (2013.01)

(58) Field of Classification Search
CPC ...... G02B 3/12; G02B 5/3016; G02B 27/286; G02F 1/0136; G02F 1/1347; G02F 1/13471
See application file for complete search history.

(56) References Cited

U.S. PATENT DOCUMENTS

2020/0348528 A1* 11/2020 Jamali .................... G02B 27/28
2021/0088782 A1* 3/2021 Zhao .................. G02B 27/0068

OTHER PUBLICATIONS

Yannanqi Li et al., "Broadband cholesteric liquid crystal lens for chromatic aberration correction in catadioptric virtual reality optics," Optics Express, 29(4), pp. 6011-6020, 2021.

* cited by examiner

*Primary Examiner* — Jessica M Merlin
(74) *Attorney, Agent, or Firm* — Ohlandt, Greeley and Perle, LLP (57) ABSTRACT

A pancake lens assembly includes a partially reflective mirror, a reflective polarizer, a quarter waveplate, a polarization-dependent optical device, and at least one polarization controller. When a light beam is introduced into the pancake lens assembly along an optical axis in a Z direction to pass through the polarization controller in a first state, a polarization direction of the light beam is converted by the polarization controller. When the light beam is introduced into the pancake lens assembly along the optical axis to pass through the polarization controller in a second state, the polarization direction of the light beam is prevented from being converted by the polarization controller.

17 Claims, 10 Drawing Sheets

PANCAKES LENS ASSEMBLY

CROSS-REFERENCE TO RELATED APPLICATION

This application claims priority of Taiwanese Invention Patent Application No. 111103681, filed on Jan. 27, 2022.

FIELD

The disclosure relates to a pancake lens assembly, and more particularly to a pancake lens assembly with an adjustable optical power.

BACKGROUND

A near-eye display (for example, a head-mounted display) for a virtual reality (VR) system, an augmented reality (AR) system, and so on, is used to create a virtual image in the field of view (FOV) for both eyes of a user. However, the near-eye display might cause visual fatigue, eyestrain, and so on, which are collectively referred to as vergence-accommodation conflict (VAC). In this case, two eyes of the user might not verge and accommodate at the same time for estimating the relative distance of objects.

In addition, to give the user an improved FOV, a distance between the near-eye display and each of the eyes is normally kept at a range from 15 mm to 25 mm. The eyes of a user wearing eyeglasses may not be kept in the aforesaid distance range, which might adversely affect the FOV. In addition, it is cumbersome if the eyeglasses are necessary to be provided between the user and the near-eye display for viewing images.

SUMMARY

Therefore, an object of the disclosure is to provide a pancake lens assembly which may mitigate the VAC caused by the near-eye display, and/or which may be used for vision correction.

According to the disclosure, a pancake lens assembly includes a partially reflective mirror, a reflective polarizer, a quarter waveplate, a polarization-dependent optical device, and at least one polarization controller. The reflective polarizer is disposed rearwardly of the partially reflective mirror. The quarter waveplate is disposed between the partially reflective mirror and the reflective polarizer. The polarization-dependent optical device is disposed between the quarter waveplate and the reflective polarizer. The at least one polarization controller is located at one of a front position and a rear position. The front position is located between the quarter waveplate and the polarization-dependent optical device. The rear position is located between the polarization-dependent optical device and the reflective polarizer. The polarization controller is configured to be electrically driven to switch from a first state to a second state. When a light beam is introduced into the pancake lens assembly along an optical axis in a Z direction to pass through the polarization controller in the first state, a polarization direction of the light beam is converted by the polarization controller. When the light beam is introduced into the pancake lens assembly along the optical axis to pass through the polarization controller in the second state, the polarization direction of the light beam is prevented from being converted by the polarization controller.

BRIEF DESCRIPTION OF THE DRAWINGS

Other features and advantages of the disclosure will become apparent in the following detailed description of the embodiment(s) with reference to the accompanying drawings, in which.

DETAILED DESCRIPTION

Before the disclosure is described in greater detail, it should be noted that where considered appropriate, reference numerals have been repeated among the figures to indicate corresponding or analogous elements, which may optionally have similar characteristics.

To aid in describing the disclosure, directional terms may be used in the specification and claims to describe portions of the present disclosure (e.g., front, rear, left, right, top, bottom, etc.). These directional definitions are intended to merely assist in describing and claiming the disclosure and are not intended to limit the disclosure in any way.

It should be noted that the drawings, which are for illustrative purposes only, are not drawn to scale, and are not intended to represent the actual sizes or actual relative sizes of the components of the pancake lens assembly.

Figure 1:
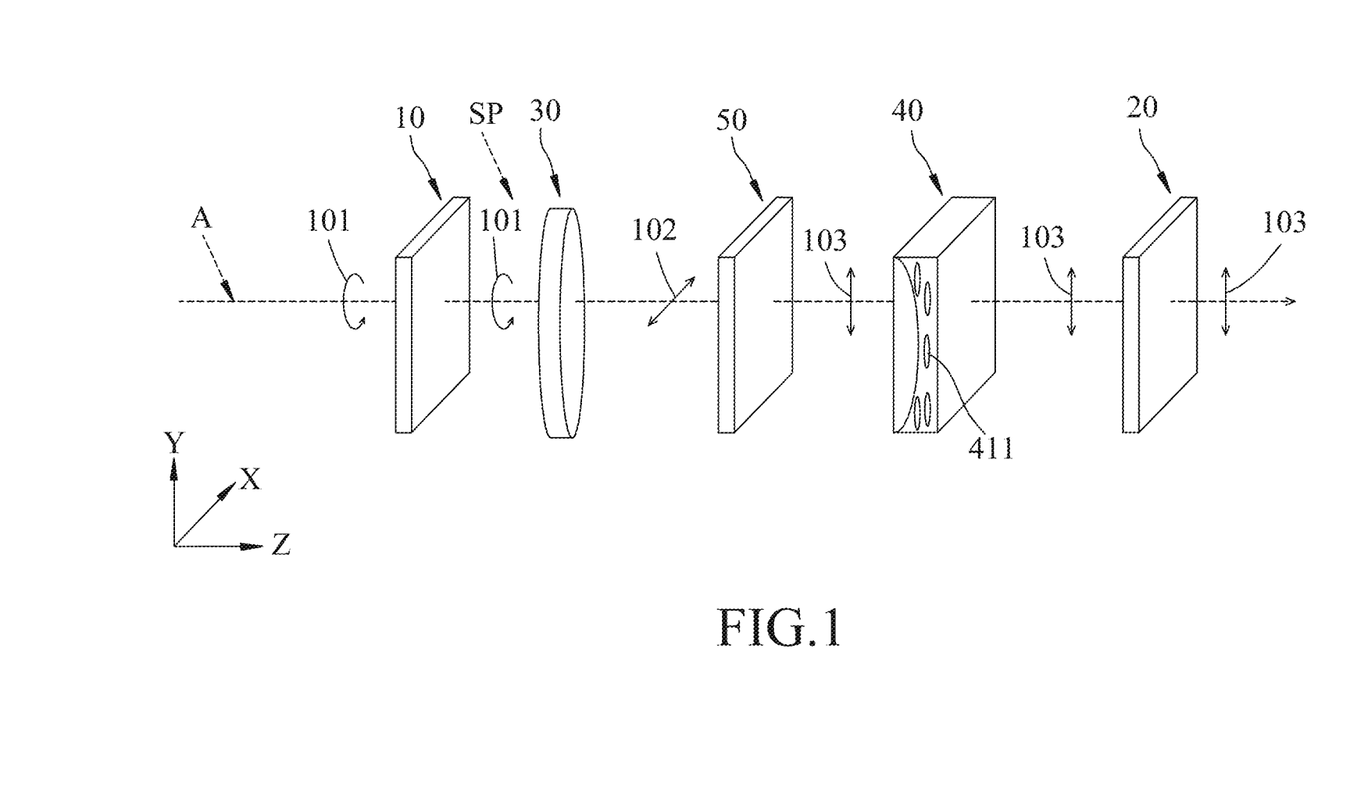
FIG. 1 is a schematic view illustrating a pancake lens assembly in accordance with some embodiments of the disclosure, in which a polarization controller is located at a front position and is in a first state.
Figure 2:
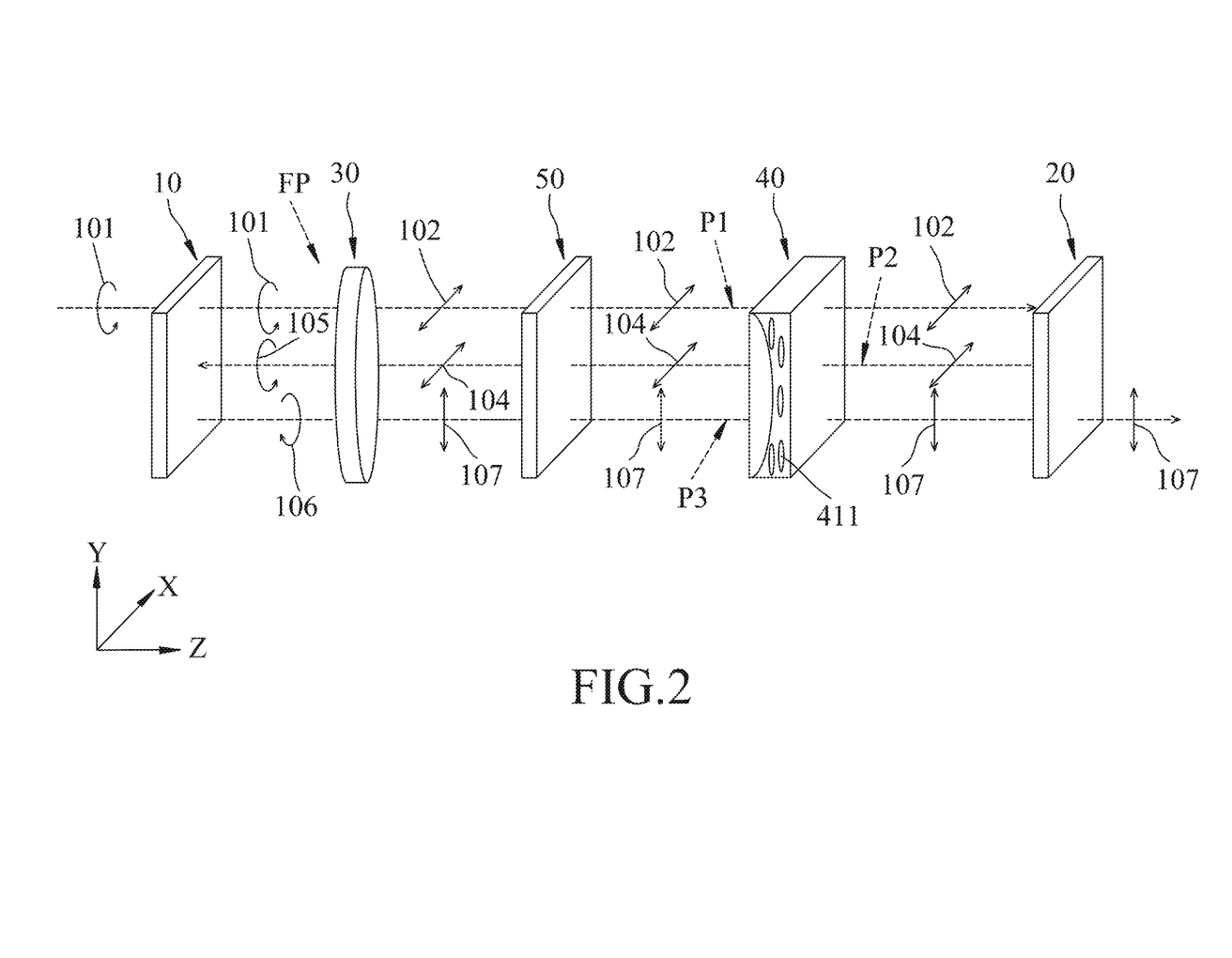
FIG. 2 is a view similar to that of FIG. 1 but illustrating the polarization controller in a second state.

Referring to FIGS. 1 and 2, a pancake lens assembly in accordance with some embodiments is shown to include a partially reflective mirror 10, a reflective polarizer 20, a quarter waveplate 30, a polarization-dependent optical device 40, and a polarization controller 50. As shown in FIGS. 1 and 2, X, Y and Z directions are orthogonal to one another. In some embodiments, the elements 10, 30, 50, 40, 20 are bonded to each other in such order along an optical axis (A) in the Z direction.

The partially reflective mirror 10 may be located rearwardly of a display (not shown, for example, a near-eye display, a head-mounted display, and so on), and may be a 50/50 mirror which reflects about 50% of a light beam emitted from the display and which transmits about 50% of the light beam. In some embodiments, the partially reflective mirror 10 is configured to partially transmit a first circularly polarized light from the display, and to partially reflect and transform the first circularly polarized light into a second circularly polarized light having a circular polarization direction different from that of the first circularly polarized light. In some embodiments, the first circularly polarized light is a left circularly (L-circularly) polarized light, and the second circularly polarized light is a right circularly (R-circularly) polarized light.

The reflective polarizer 20 is disposed rearwardly of the partially reflective mirror 10, and is configured to reflect a first linearly polarized light and to transmit a second linearly polarized light having a linear polarization direction different from that of the first linearly polarized light. In some embodiments, the polarization direction of the first linearly polarized light is different from that of the second linearly polarized light by about 90 degrees. In certain embodiments, the first linearly polarized light is an X-polarized light which is polarized in the X direction, and the second linearly polarized light is a Y-polarized light which is polarized in the Y direction.

The quarter waveplate 30 is disposed between the partially reflective mirror 10 and the reflective polarizer 20. The quarter waveplate 30 is configured to transform the first circularly polarized light into the first linearly polarized light, to transform the first linearly polarized light into the first circularly polarized light, to transform the second circularly polarized light into the second linearly polarized light, and to transform the second linearly polarized light into the second circularly polarized light.

Figure 3:
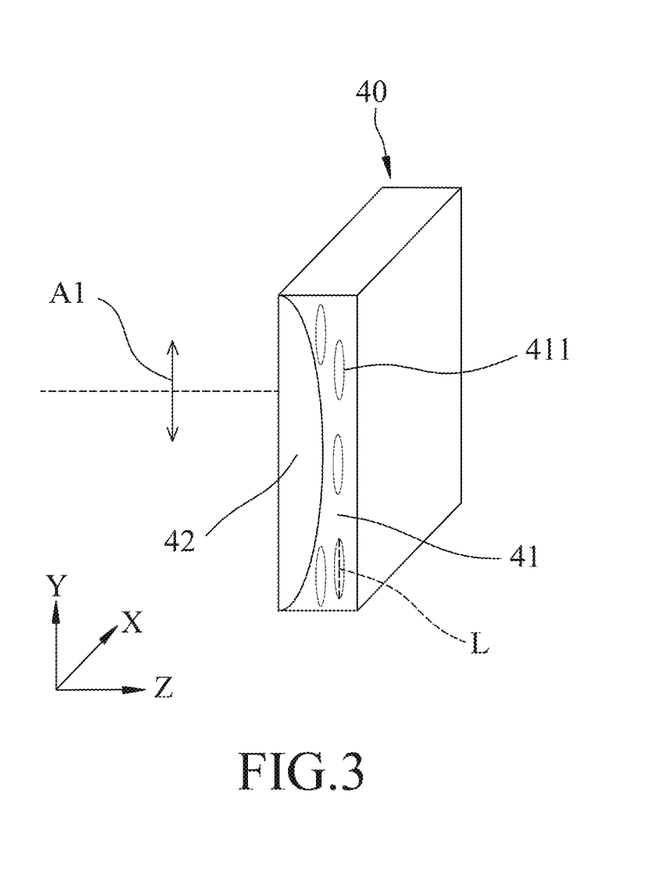
FIG. 3 is a schematic view of a liquid crystal lens device with a thickness gradient in accordance with some embodiments of the disclosure, illustrating a polarization direction of a linearly polarized light being arranged parallel to a plane.
Figure 4:
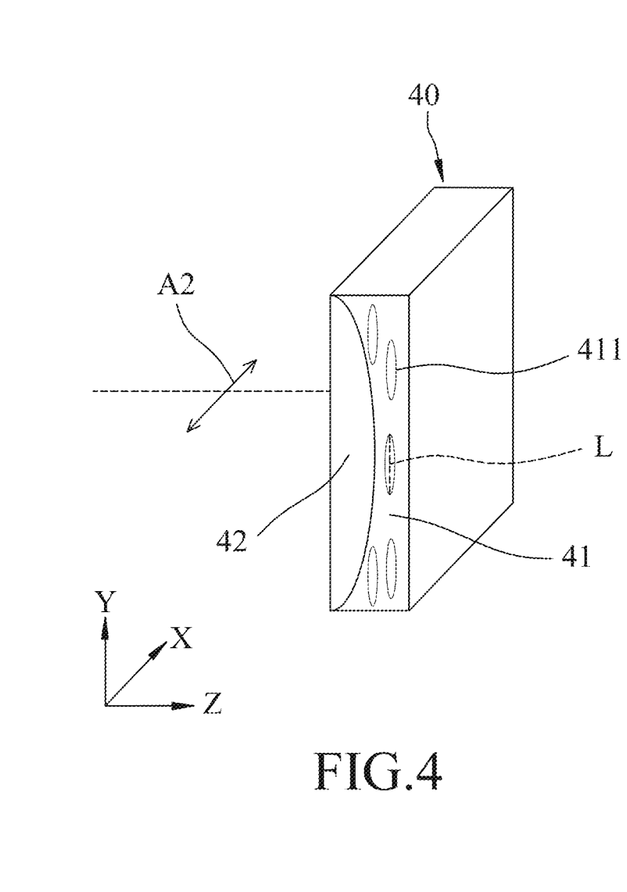
FIG. 4 is a view similar to that of FIG. 3 but illustrating a polarization direction of a linearly polarized light being arranged orthogonal to the plane.

The polarization-dependent optical device 40 is disposed between the quarter waveplate 30 and the reflective polarizer 20. In some embodiments, the polarization-dependent optical device 40 is a transmissive liquid crystal device. In some embodiments, the polarization-dependent optical device 40 is selected from the group consisting of a liquid crystal lens with a fixed focus, an electrically tunable focusing liquid crystal lens, a liquid crystal grating, a liquid crystal prism, a liquid crystal wavefront corrector, a metalens, and combinations thereof. In some embodiments, the polarization-dependent optical device 40 includes liquid crystal molecules 411 therein, and long axes (L) of the liquid crystal molecules 411 are all parallel to one of an X-Z plane and a Y-Z plane. The X-Z plane is defined by the X and Z directions. The Y-Z plane is defined by the Y and Z directions. In some embodiments, as shown in FIGS. 3 and 4, the long axes (L) of the liquid crystal molecules 411 are all orientated in the Y direction and are all orientated parallel to the Y-Z plane. In certain embodiments, as shown in FIGS. 5 and 6, the long axes (L) of the liquid crystal molecules 411 are all orientated parallel to the X-Z plane.

In some embodiments, the polarization-dependent optical device 40 may be a liquid crystal lens device with a thickness gradient (see FIGS. 3 and 4), a liquid crystal lens device with a refractive index gradient (see FIGS. 5 and 6), a Pancharatnam-Berry phase liquid crystal lens (not shown), or other suitable liquid crystal lens.

In some embodiments, as shown in FIGS. 3 and 4, the polarization-dependent optical device 40 includes a liquid crystal unit 41 including the liquid crystal molecules 411 therein, and an optical lens 42. The optical lens 42 may be a solid lens, a concave lens, a plano-concave lens, a convex lens, a plano-convex lens, a freeform optical lens, or other suitable optical lens. In some embodiments, as shown in FIGS. 5 and 6, the liquid crystal molecules 411 in the polarization-dependent optical device 40 are arranged to permit the polarization-dependent optical device 40 to have a radial gradient refractive index.

Figure 5:
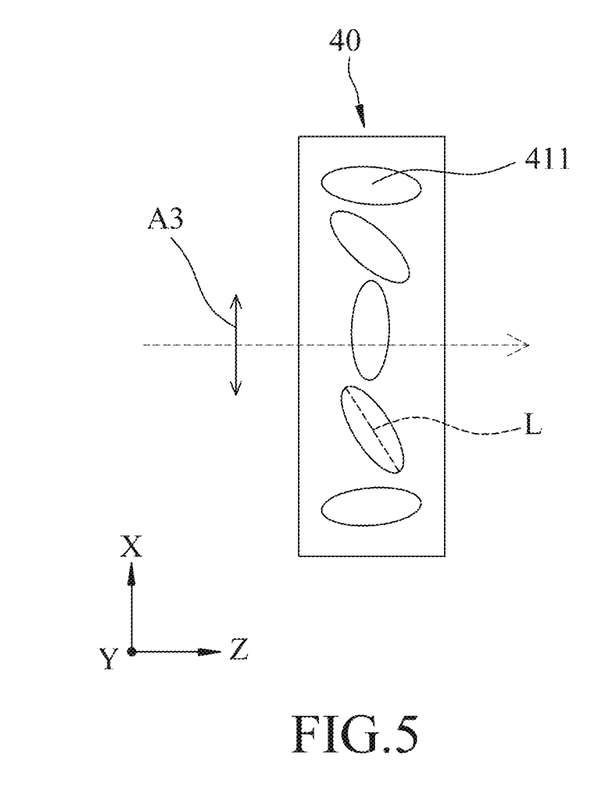
FIGS. 5 and 6 are views similar to those of FIGS. 3 and 4, respectively, but illustrating a liquid crystal lens device with a refractive index gradient.
Figure 6:
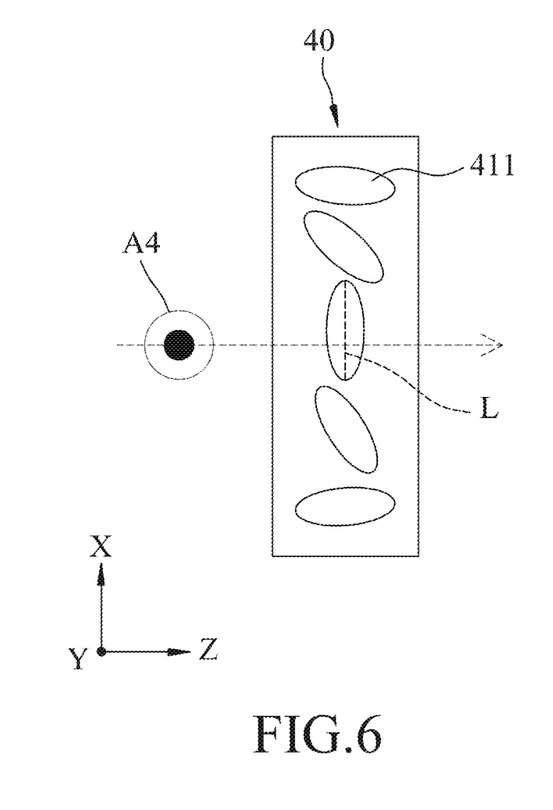

Referring to FIGS. 3 and 5, when a polarization direction (A1, A3) of the linearly polarized light is arranged parallel to a plane (i.e., the Y-Z plane shown in FIG. 3 or the X-Z plane shown in FIG. 5) which the long axes (L) of the liquid crystal molecules 411 are all parallel thereto, the linearly polarized light is designated as an extraordinary ray and the polarization-dependent optical device 40 may have an optical power (Pe). In this case, when orientations of the liquid crystal molecules 411 are varied, the optical power is varied accordingly.

Referring to FIGS. 4 and 6, when a polarization direction (A2, A4) of the linearly polarized light is arranged orthogonal to the plane (i.e., the Y-Z plane shown in FIG. 3 or the X-Z plane shown in FIG. 5) which the long axes (L) of the liquid crystal molecules 411 are all parallel thereto, the linearly polarized light is designated as an ordinary ray and the polarization-dependent optical device 40 may have an optical power (Po). In this case, when orientations of the liquid crystal molecules 411 are varied, the optical power is not varied.

The polarization controller 50 is located at one of a front position and a rear positon. The front position is located between the quarter waveplate 30 and the polarization-dependent optical device 40, and the rear position is located between the polarization-dependent optical device 40 and the reflective polarizer 20. In some embodiments, as shown in FIGS. 1 and 2, the polarization controller 50 is located at the front position. The polarization controller 50 is configured to be electrically driven to switch from a first state to a second state. When a light beam from the display is introduced into the pancake lens assembly to pass through the polarization controller 50 at the first state (FIG. 1), a polarization direction of the light beam is converted by the polarization controller 50. In some embodiments, the first linearly polarized light is converted, by the polarization controller 50 at the first state, into the second linearly polarized light. Also, the second linearly polarized light can be converted, by the polarization controller 50 at the first state, into the first linearly polarized light.

When the light beam is introduced into the pancake lens assembly to pass through the polarization controller 50 at the second state (FIG. 2), the polarization direction of the light beam is prevented from being converted by the polarization controller 50.

In some embodiments, the polarization controller 50 may be a twisted nematic (TN) liquid crystal cell, a liquid crystal waveplate, or a combination thereof. In certain embodiments, the polarization controller 50 is a TN liquid crystal cell which can be switched between the first state (off state) and the second state (on state) in a very short time period. When no electrical field is applied to the TN liquid crystal cell (i.e., the TN liquid crystal cell is in an "off" state), the polarization direction of the light beam may be converted about 90 degrees by the TN liquid crystal cell. When an electrical field is applied to the TN liquid crystal cell (i.e., the TN liquid crystal cell is in an "on" state), the polarization direction of the light beam is substantially not converted.

Referring to FIG. 1, when the light beam is introduced into the pancake lens assembly through the partially reflective mirror 10 and when the polarization controller 50 is in the first state, a straight light path (SP) is formed to pass through the polarization-dependent optical device 40 only one time. The polarization transformation of the light beam in the pancake lens assembly as shown in FIG. 1 is described hereinafter. An L-circularly polarized light represented by an arrow 101 from the display passes through the partially reflective mirror 10, and then encounters the quarter waveplate 30. The quarter waveplate 30 transforms the L-circularly polarized light represented by the arrow 101 into an X-polarized light represented by an arrow 102. Thereafter, the polarization controller 50 at the first state transforms the X-polarized light into a Y-polarized light represented by an arrow 103. The Y-polarized light passes through the polarization-dependent optical device 40 and the reflective polarizer 20 to reach an eye of a user (not shown). Therefore, as shown in FIG. 1, in the case that (i) the polarization controller 50 is in the first state and (ii) the Y-polarized light represented by the arrow 103 passes through the polarization-dependent optical device 40, the pancake lens assembly has an optical power (Pe) when the long axes (L) of the liquid crystal molecules 411 are all orientated in the Y direction and/or parallel to the Y-Z plane (see FIG. 3), and has an optical power (Po) when the long axes (L) of the liquid crystal molecules 411 are all orientated in the X direction and/or parallel to the X-Z plane (see FIG. 6).

Referring to FIG. 2, when the light beam is introduced into the pancake lens assembly and when the polarization controller 50 is in the second state, a folded light path (FP) is formed between the partially reflective mirror 10 and the reflective polarizer 20 to pass through the polarization-dependent optical device 40 three times. The folded light path (FP) includes three transmitting path segments (P1, P2, P3) each passing through the polarization-dependent optical device 40 such that the light beam, when traveling on two of the three transmitting path segments (P1, P2) to pass through the polarization-dependent optical device 40, is polarized in the X direction, and such that the light beam, when traveling on a remaining one of the three transmitting path segments (P3) to pass through the polarization-dependent optical device 40, is polarized in the Y direction. The polarization transformation of the light beam in the pancake lens assembly as shown in FIG. 2 is described hereinafter. An L-circularly polarized light represented by an arrow 101 from the display passes through the partially reflective mirror 10, and then encounters the quarter waveplate 30. The quarter waveplate 30 transforms the L-circularly polarized light into an X-polarized light represented by an arrow 102. The X-polarized light passes through the polarization controller 50 without being converted. Then, the X-polarized light represented by the arrow 102 traveling on the transmitting path segment (P1) passes through the polarization-dependent optical device 40 for the first time, and is reflected by the reflective polarizer 20. Thereafter, the reflected X-polarized light represented by an arrow 104 traveling on the transmitting path segment (P2) passes through the polarization-dependent optical device 40 for the second time, and then passes through the polarization controller 50 without being converted. Afterward, the X-polarized light encounters the quarter waveplate 30. The quarter waveplate 30 transforms the X-polarized light into an L-circularly polarized light represented by an arrow 105. The partially reflective mirror 10 reflects and transforms the L-circularly polarized light into an R-circularly polarized light represented by an arrow 106. Next, the quarter waveplate 30 transforms the R-circularly polarized light into a Y-polarized light represented by an arrow 107. The Y-polarized light passes through the polarization controller 50 without being converted. Thereafter, the Y-polarized light traveling on the transmitting path segment (P3) passes through the polarization-dependent optical device 40 for the third time, and then passes through the reflective polarizer 20 to reach an eye of the user (not shown).

Therefore, as shown in FIG. 2, in the case that (i) the polarization controller 50 is in the second state, (ii) the X-polarized light passes through the polarization-dependent optical device 40 twice, and (iii) the Y-polarized light passes through the polarization-dependent optical device 40 once, the polarization transformation of the light beam in the pancake lens assembly is similar to that for a pancake lens assembly without the polarization controller 50. That is, the pancake lens assembly has an optical power (2Po+Pe) when the long axes (L) of the liquid crystal molecules 411 are all orientated in the Y direction and/or parallel to the Y-Z plane (see FIGS. 3 and 4), and has an optical power (Po+2Pe) when the long axes (L) of the liquid crystal molecules 411 are all orientated in the X direction and/or parallel to the X-Z plane (see FIGS. 5 and 6).

Please note that the polarization states in FIGS. 1 and 2 are provided for illustration purpose only, and may be varied based on the polarization state of the light beam from the display and the property of the reflective polarizer 20. For example, in the case that the light beam from the display is an R-circularly polarized light or in the case that the reflective polarizer 20 reflects a Y-polarized light and transmits an X-polarized light, the polarization states in the light path may be varied.

In addition, although the elements 10, 20, 30, 40, 50 are shown to be separated from each other in the abovementioned figures for better illustration, those elements are bonded to each other without gaps therebetween.

Figure 7:
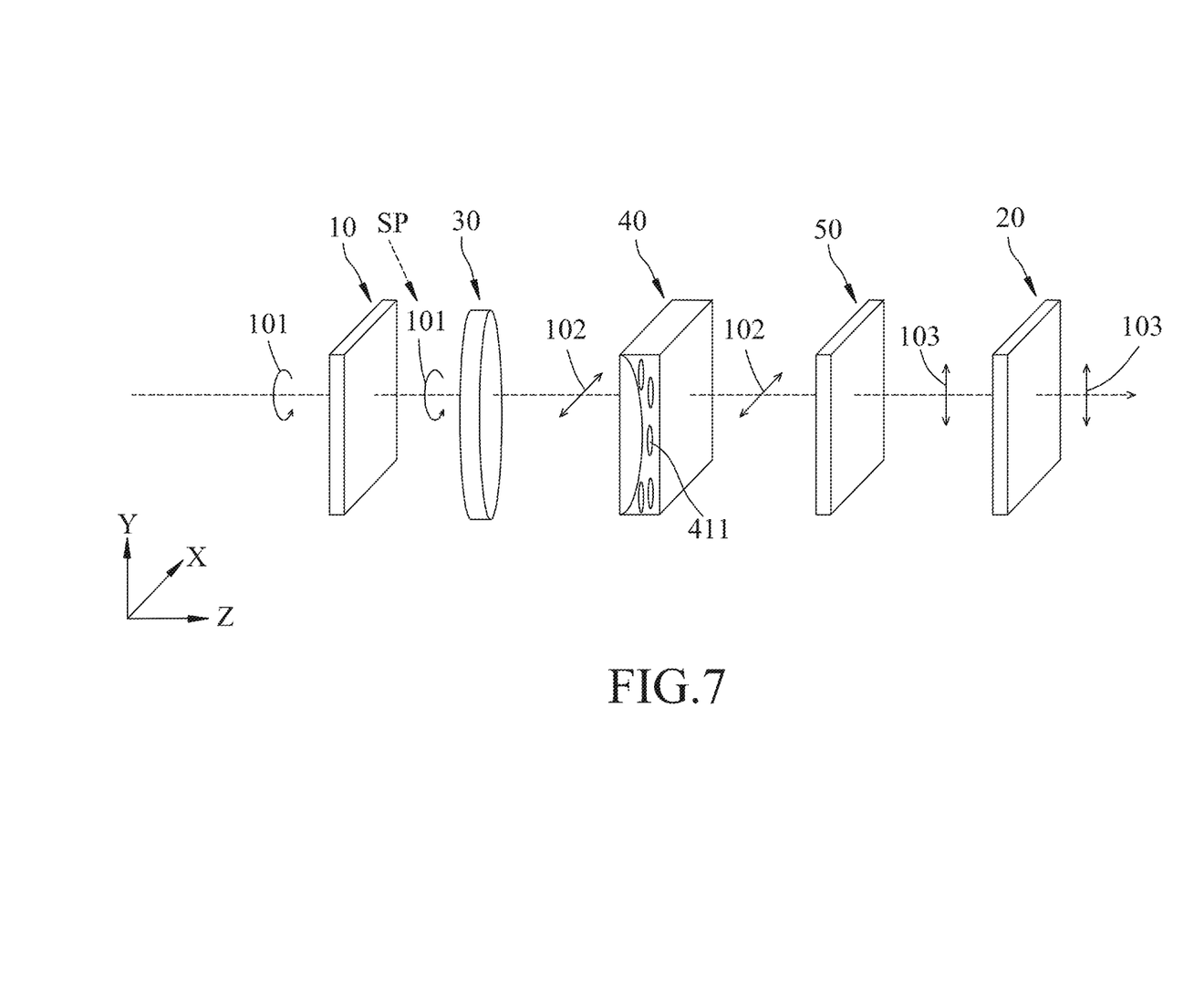
FIG. 7 is a view similar to that of FIG. 1 but illustrating the polarization controller being located at a rear position.
Figure 8:
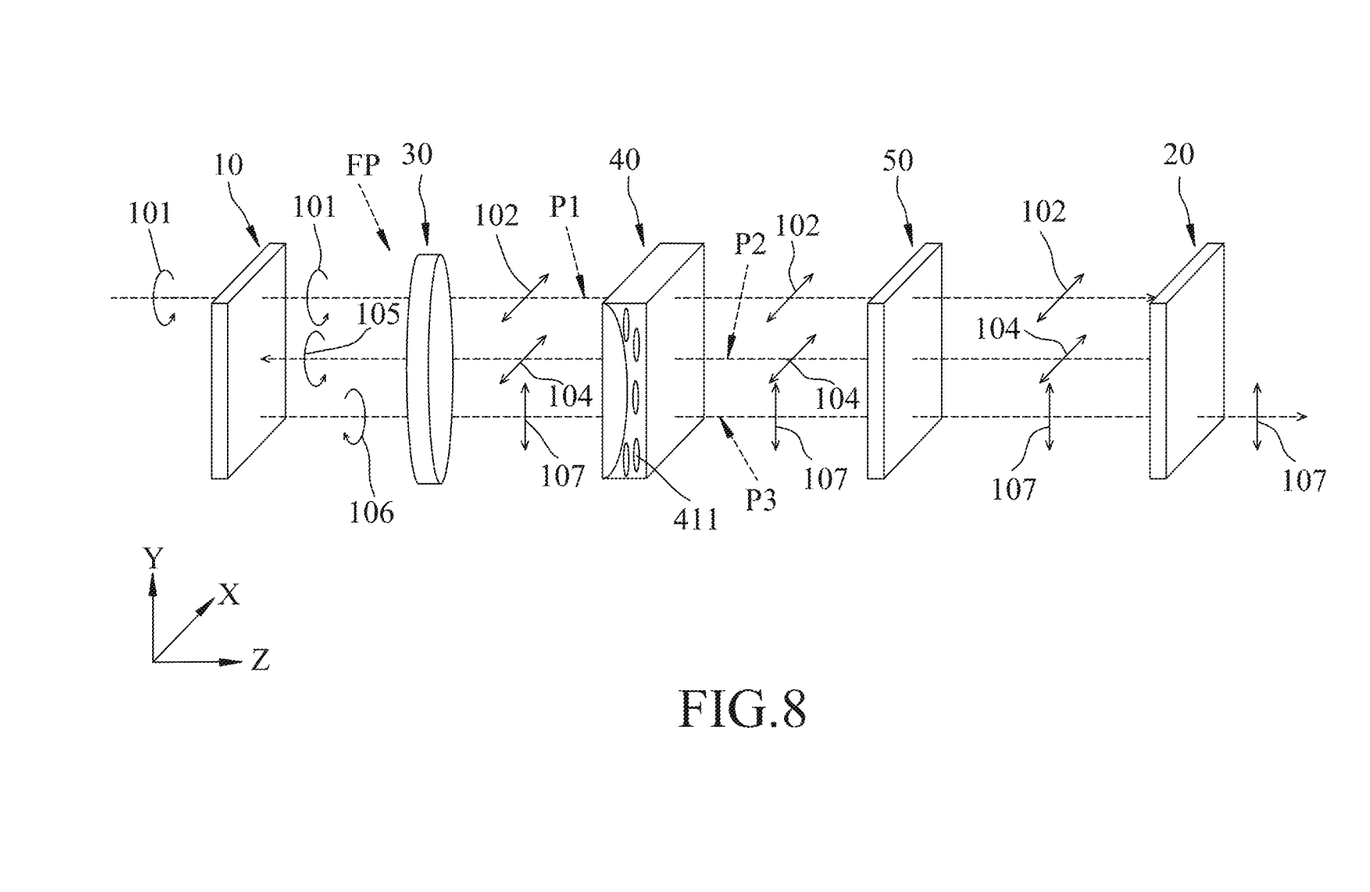
FIG. 8 is a view similar to that of FIG. 7 but illustrating the polarization controller in a second state.

FIGS. 7 and 8 illustrate a pancake lens assembly in accordance with some embodiments. The pancake lens assembly shown in FIGS. 7 and 8 is similar to that shown in FIGS. 1 and 2, except that, in FIGS. 7 and 8, the polarization controller 50 is located at the rear position.

When the light beam is introduced into the pancake lens assembly, and when the polarization controller 50 is in the first position, as shown in FIG. 7, a straight light path (SP) is formed to pass through the polarization-dependent optical device 40 only one time. The polarization transformation of the light beam in the pancake lens assembly shown in FIG. 7 is similar to that shown in FIG. 1 except for the polarization direction of the light beam that passes through the polarization-dependent optical device 40. In FIG. 1, the Y-polarized light represented by the arrow 103 passes through the polarization-dependent optical device 40, whereas in FIG. 7, the X-polarized light passes through the polarization-dependent optical device 40. Therefore, as shown in FIG. 7, in the case that (i) the polarization controller 50 is in the first state, and (ii) the X-polarized light passes through the polarization-dependent optical device 40, the pancake lens assembly has an optical power (Po) when the long axes (L) of the liquid crystal molecules 411 are all orientated in the Y direction and/or parallel to the Y-Z plane (see FIG. 4), and has an optical power (Pe) when the long axes (L) of the liquid crystal molecules 411 are all orientated in the X direction and/or parallel to the X-Z plane (see FIG. 5).

Referring to FIG. 8, when the light beam is introduced into the pancake lens assembly and when the polarization controller 50 is in the second state, a folded light path (FP) is formed between the partially reflective mirror 10 and the reflective polarizer 20 to pass through the polarization-dependent optical device 40 three times. In the case that the polarization controller 50 is in the second state, the polarization transformation of the light beam in the pancake lens assembly is similar to that for a pancake lens assembly without the polarization controller 50 or that of the pancake lens assembly shown in FIG. 2. That is, the pancake lens assembly has an optical power (2Po+Pe) when the long axes (L) of the liquid crystal molecules 411 are all orientated in the Y direction and/or parallel to the Y-Z plane (see FIGS. 3 and 4), and has an optical power (Po+2Pe) when the long axes (L) of the liquid crystal molecules 411 are all orientated in the X direction and/or parallel to the X-Z plane (see FIGS. 5 and 6).

FIGS. 9 to 12 illustrate a pancake lens assembly in accordance with some embodiments. The pancake lens assembly shown in FIGS. 9 to 12 are similar to that shown in FIGS. 1 and 2, except that, in FIGS. 9 to 12, two of the polarization controllers 50 are located at the front and rear positions, respectively. In the following description, the polarization controller 50 at the front position is referred to as the front polarization controller 50, and the polarization controller 50 at the rear position is referred to as the rear polarization controller 50.

Figure 9:
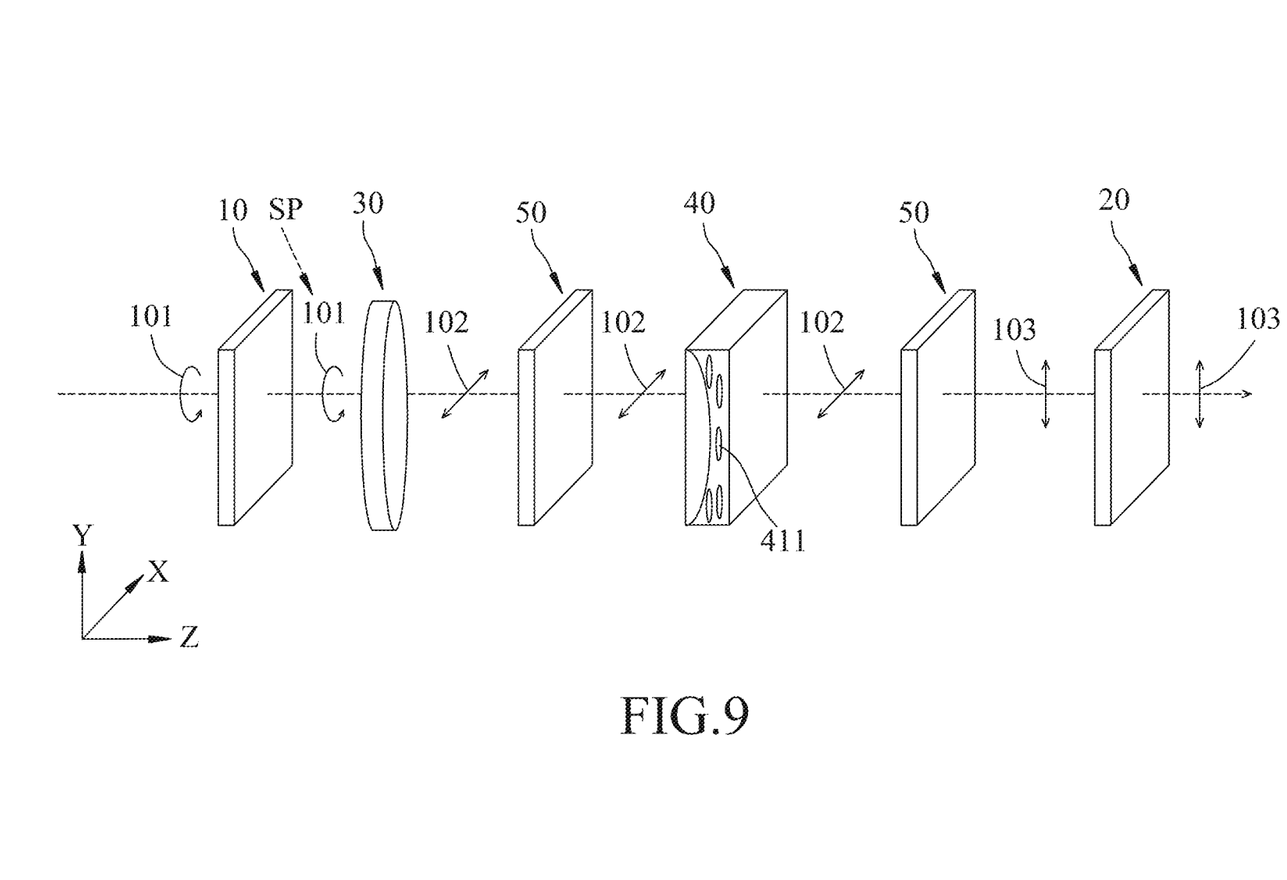
FIG. 9 is a view similar to that of FIG. 1 but illustrating two of the polarization controllers located at the front and rear positions, respectively, and being in the second state and the first state, respectively.
Figure 10:
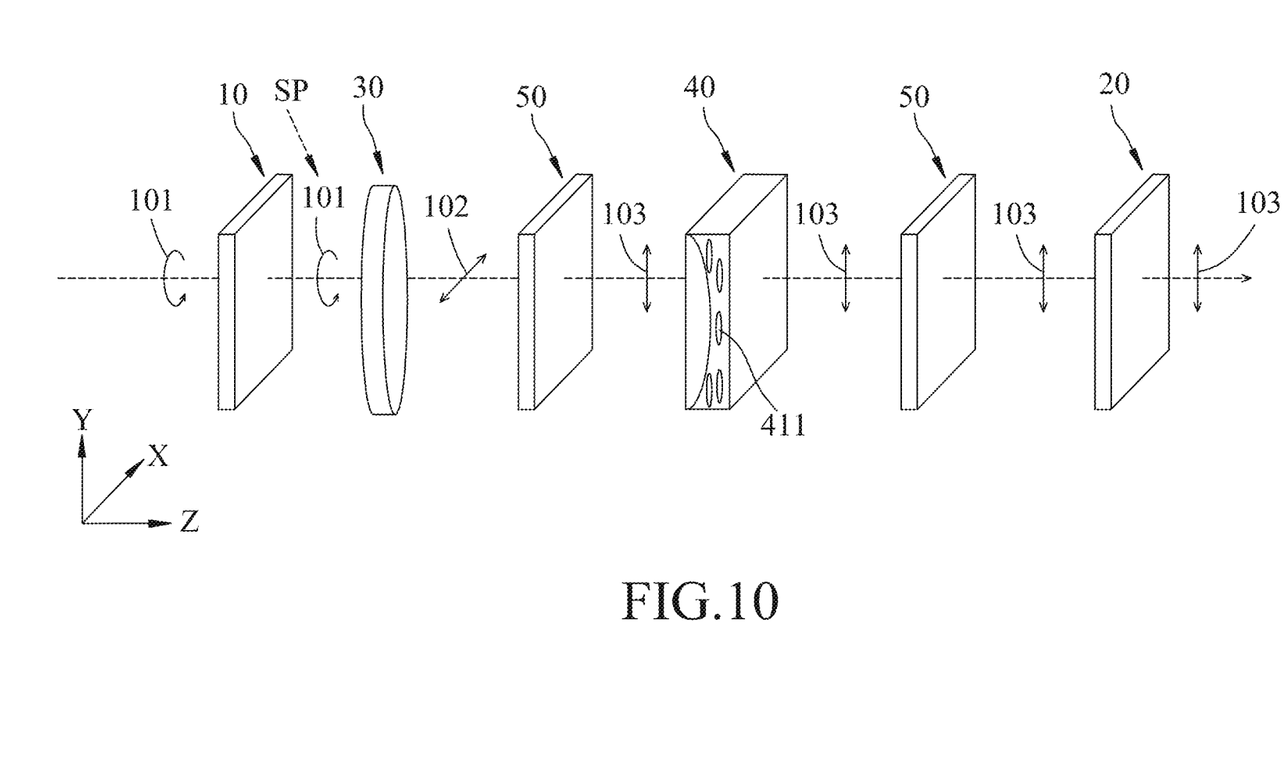
FIG. 10 is a view similar to that of FIG. 9 but illustrating the polarization controller at the front position being in the first state, and the polarization controller at the rear position being in the second state.

As shown in FIGS. 9 and 10, when the light beam is introduced to the pancake lens assembly and when one of the polarization controllers 50 is in the first state and the other one of the polarization controllers 50 is in the second state, a straight light path (SP) is formed to pass through the polarization-dependent optical device 40 only one time.

As shown in FIG. 9, in the case that the front polarization controller 50 is in the second state and the rear polarization controller 50 is in the first state, the polarization transformation of the light beam in the pancake lens assembly is similar to that of the pancake lens assembly having a rear polarization controller only (see FIG. 7). That is, the X-polarized light passes through the polarization-dependent optical device 40 and the pancake lens assembly has an optical power (Po) when the long axes (L) of the liquid crystal molecules 411 are all orientated in the Y direction and/or parallel to the Y-Z plane (see FIG. 4), and has an optical power (Pe) when the long axes (L) of the liquid crystal molecules 411 are all orientated in the X direction and/or parallel to the X-Z plane (see FIG. 5).

As shown in FIG. 10, in the case that the front polarization controller 50 is in the first state and the rear polarization controller 50 is in the second state, the polarization transformation of the light beam in the pancake lens assembly is similar to that of the pancake lens assembly having a front polarization controller (see FIG. 1). That is, the Y-polarized light passes through the polarization-dependent optical device 40 and the pancake lens assembly has an optical power (Pe) when the long axes (L) of the liquid crystal molecules 411 are all orientated in the Y direction and/or parallel to the Y-Z plane (see FIG. 3), and has an optical power (Po) when the long axes (L) of the liquid crystal molecules 411 are all orientated in the X direction and/or parallel to the X-Z plane (see FIG. 6).

Figure 11:
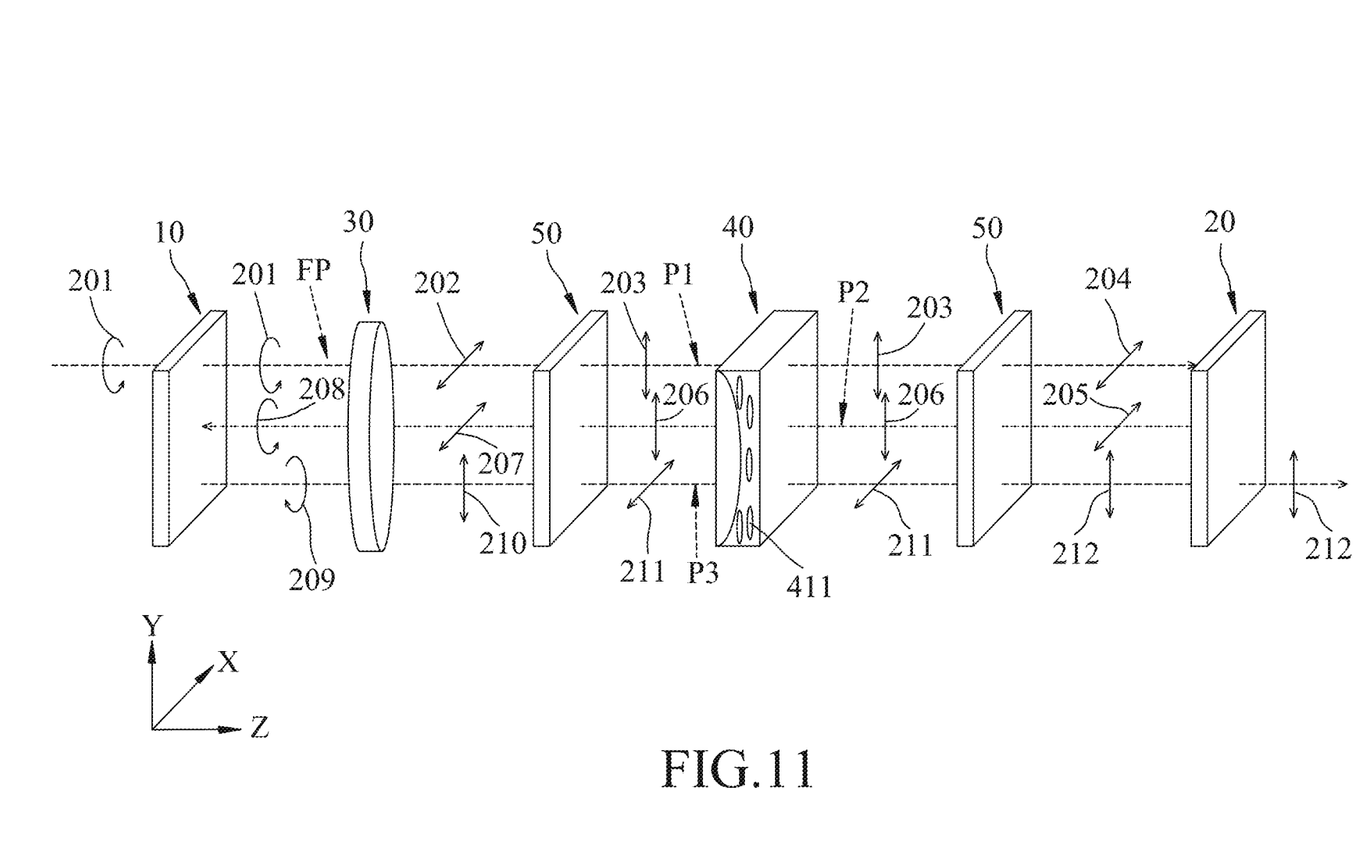
FIG. 11 is a view similar to that of FIG. 9 but illustrating both the polarization controllers being in the first state.
Figure 12:
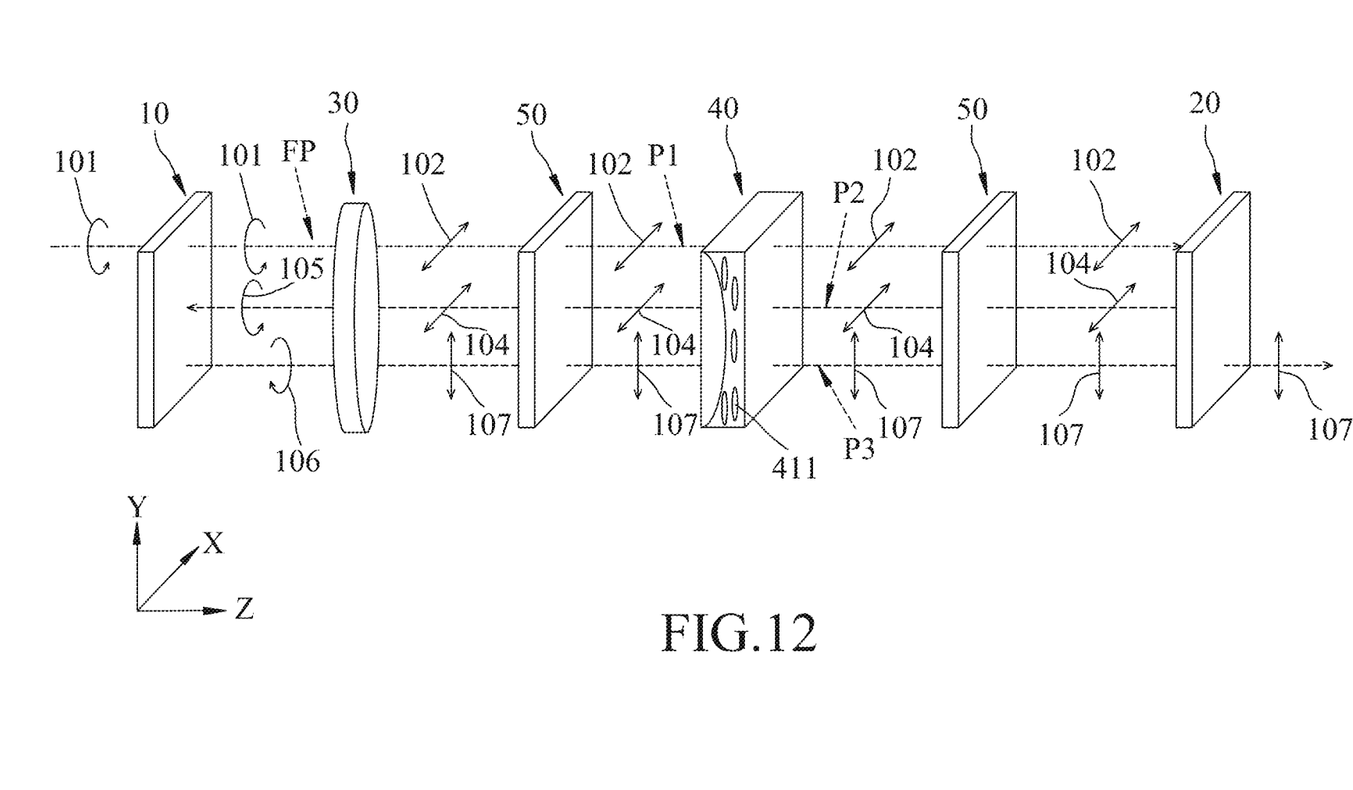
FIG. 12 is a view similar to that of FIG. 9 but illustrating both the polarization controllers being in the second state.

As shown in FIGS. 11 and 12, when the light beam is introduced to the pancake lens assembly, and when both the polarization controllers 50 are in the first state or the second state, a folded light path (FP) is formed between the partially reflective mirror 10 and the reflective polarizer 20 to pass through the polarization-dependent optical device 40 three times.

As shown in FIG. 11, the polarization transformation of the light beam in the pancake lens assembly in the case that both the polarization controllers 50 are in the first state is described hereinafter. An L-circularly polarized light represented by an arrow 201 from the display passes through the partially reflective mirror 10, and then encounters the quarter waveplate 30. The quarter waveplate 30 transforms the L-circularly polarized light into an X-polarized light represented by an arrow 202. The front polarization controller 50 at the first state transforms the X-polarized light into a Y-polarized light represented by an arrow 203. The Y-polarized light traveling on the transmitting path segment (P1) passes through the polarization-dependent optical device 40 for the first time. The rear polarization controller 50 at the first state transforms the Y-polarized light into an X-polarized light represented by an arrow 204. The X-polarized light is then reflected by the reflective polarizer 20. The reflected X-polarized light represented by an arrow 205 is converted by the rear polarization controller 50 at the first state into a Y-polarized light represented by an arrow 206. The Y-polarized light traveling on the transmitting path segment (P2) passes through the polarization-dependent optical device 40 for the second time. Thereafter, the front polarization controller 50 at the first state transforms the Y-polarized light into an X-polarized light represented by an arrow 207. Afterward, the quarter waveplate 30 transforms the X-polarized light into an L-circularly polarized light represented by an arrow 208. The partially reflective mirror 10 reflects and transforms the L-circularly polarized light into an R-circularly polarized light represented by an arrow 209. Next, the quarter waveplate 30 transforms the R-circularly polarized light into a Y-polarized light represented by an arrow 210. The Y-polarized light is converted by the front polarization controller 50 at the first state into an X-polarized light represented by an arrow 211. The X-polarized light traveling on the transmitting path segment (P3) passes through the polarization-dependent optical device 40 for the third time. Thereafter, the X-polarized light is converted by the rear polarization controller 50 at the first state into a Y-polarized light represented by an arrow 212. Finally, the Y-polarized light passes through the reflective polarizer 20 to reach an eye of the user (not shown).

Therefore, as shown in FIG. 11, in the case that (i) both the polarization controllers 50 are in the first state, (ii) the Y-polarized light passes through the polarization-dependent optical device 40 twice, and (iii) the X-polarized light passes through the polarization-dependent optical device 40 once, the pancake lens assembly has an optical power (Po+2Pe) when the long axes (L) of the liquid crystal molecules 411 are all orientated in the Y direction and/or parallel to the Y-Z plane (see FIGS. 3 and 4), and has an optical power (2Po+Pe) when the long axes (L) of the liquid crystal molecules 411 are all orientated in the X direction and/or parallel to the X-Z plane (see FIGS. 5 and 6).

As shown in FIG. 12, in the case that both the polarization controllers 50 are in the second state, the polarization transformation of the light beam in the pancake lens assembly is similar to that of a pancake lens assembly without the polarization controller 50 or that of the pancake lens assembly shown in FIG. 2 or 8. That is, the pancake lens assembly has an optical power (2Po+Pe) when the long axes (L) of the liquid crystal molecules 411 are all orientated in the Y direction and/or parallel to the Y-Z plane (see FIGS. 3 and 4), and has an optical power (Po+2Pe) when the long axes (L) of the liquid crystal molecules 411 are all orientated in the X direction and/or parallel to the X-Z plane (see FIGS. 5 and 6).

In the case that the pancake lens assembly includes the front and rear polarization controllers 50, the pancake lens assembly will have four optical powers (Pe, Po, 2Po+Pe, Po+2Pe), regardless of whether the long axes (L) of the liquid crystal molecules 411 are all orientated parallel to the Y-Z plane or the X-Z plane. Assuming that the optical power (Po) is 0 diopter (0 D) and the optical power (Pe) is 1 D, the pancake lens assembly can be converted to among three different diopter values (0 D, 1 D, 2D). In the case that the polarization-dependent optical device 40 is an electrically tunable focusing liquid crystal lens, the pancake lens assembly may have a wider adjustable range for the diopter values.

In some embodiments, when a head-mounted display (not shown) with two of the pancake lens assemblies of the disclosure respectively disposed in front of two eyes of a user is worn, the optical powers of the pancake lens assemblies are adjusted separately to permit the two eyes to verge and accommodate in symphony with each other. Therefore, when viewing the head-mounted display, the image fatigue and discomfort due to a vergence-accommodation conflict may be alleviated. In this case, cameras (not shown) may be used to monitor and track the eyes of the user for facilitating the adjustment of the optical powers of the pancake lens assemblies for the two eyes.

In addition, by using the pancake lens assemblies in front of the eyes, the poor vision of the user may be also corrected. Therefore, the user may directly view the image from the head-mounted display without wearing eyeglasses or the like for vision correction.

Furthermore, the pancake lens assembly of the disclosure may also serve as at least a portion of a corrective lens for daily vision correction.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A pancake lens assembly comprising:
a partially reflective mirror;
a reflective polarizer disposed rearwardly of said partially reflective mirror;
a quarter waveplate disposed between said partially reflective mirror and said reflective polarizer;
a polarization-dependent optical device disposed between said quarter waveplate and said reflective polarizer; and
at least one polarization controller located at one of a front position between said quarter waveplate and said polarization-dependent optical device, and a rear position between said polarization-dependent optical device and said reflective polarizer, said polarization controller being configured to be electrically driven to switch from a first state to a second state,
such that when a light beam is introduced into said pancake lens assembly along an optical axis in a Z direction to pass through said polarization controller in the first state, a polarization direction of the light beam is converted by said polarization controller,
such that when the light beam is introduced into said pancake lens assembly along the optical axis to pass through said polarization controller in the second state, the polarization direction of the light beam is prevented from being converted by said polarization controller,
such that when said polarization controller is in one of the first and second states, in response to introduction of the light beam into said pancake lens assembly along the optical axis, a straight light path is formed to pass through said polarization-dependent optical device only one time, and
such that when said polarization controller is in the other one of the first and second states, in response to introduction of the light beam into said pancake lens assembly along the optical axis, a folded light path is formed between said partially reflective mirror and said reflective polarizer to pass through said polarization-dependent optical device three times.

2. The pancake lens assembly according to claim 1, wherein said polarization-dependent optical device is a transmissive liquid crystal device.

3. The pancake lens assembly according to claim 1, wherein said polarization-dependent optical device is selected from the group consisting of a liquid crystal lens with a fixed focus, an electrically tunable focusing liquid crystal lens, a liquid crystal grating, a liquid crystal prism, a liquid crystal wavefront corrector, a metalens, and combinations thereof.

4. The pancake lens assembly according to claim 1, wherein said polarization controller is selected from the group consisting of a twisted nematic liquid crystal cell, a liquid crystal waveplate, and a combination thereof.

5. The pancake lens assembly according to claim 1, wherein said polarization-dependent optical device includes liquid crystal molecules therein, long axes of the liquid crystal molecules being all orientated parallel to one of an X-Z plane and an Y-Z plane, the X-Z plane being defined by an X direction and the Z direction, the Y-Z plane being defined by a Y direction and the Z direction, the X, Y, and Z directions being orthogonal to one another.

6. The pancake lens assembly according to claim 5, wherein when said polarization controller is in the first state, in response to introduction of the light beam into said pancake lens assembly along the optical axis, the straight light path is formed to pass through said polarization-dependent optical device only one time; and
when said polarization controller is in the second state, in response to introduction of the light beam into said pancake lens assembly along the optical axis, the folded light path is formed between said partially reflective mirror and said reflective polarizer to pass through said polarization-dependent optical device three times.

7. The pancake lens assembly according to claim 6, wherein the folded light path includes three transmitting path segments each passing through said polarization-dependent optical device such that the light beam, when traveling on two of the three transmitting path segments to pass through said polarization-dependent optical device, is polarized in the X direction, and such that the light beam, when traveling on a remaining one of the three transmitting path segments to pass through said polarization-dependent optical device, is polarized in the Y direction.

8. The pancake lens assembly according to claim 5, which comprises two of said polarization controllers located at the front and rear positions, respectively.

9. The pancake lens assembly according to claim 8, wherein, when the light beam is introduced to said pancake lens assembly and when one of said polarization controllers is in the first state and the other one of said polarization controllers is in the second state, a straight light path is formed to pass through said polarization-dependent optical device only one time.

10. The pancake lens assembly according to claim 8, wherein, when the light beam is introduced to said pancake lens assembly and when both said polarization controllers are in the first state or the second state, a folded light path is formed between said partially reflective mirror and said reflective polarizer to pass through said polarization-dependent optical device three times.

11. The pancake lens assembly according to claim 10, wherein, when both said polarization controllers are in the first state, the folded light path includes three transmitting path segments each passing through said polarization-dependent optical device such that the light beam, when traveling on two of the three transmitting path segments to pass through said polarization-dependent optical device, is polarized in the Y direction, and such that the light beam, when traveling on a remaining one of the three transmitting path segments to pass through said polarization-dependent optical device, is polarized in the X direction.

12. The pancake lens assembly according to claim 10, wherein, when both said polarization controllers are in the second state, the folded light path includes three path segments each passing through said polarization-dependent optical device such that the light beam, when traveling on two of the three transmitting path segments to pass through said polarization-dependent optical device, is polarized in the X direction, and such that the light beam, when traveling on a remaining one of the three transmitting path segments to pass through said polarization-dependent optical device, is polarized in the Y direction.

13. The pancake lens assembly according to claim 5, wherein said partially reflective mirror is configured to partially transmit a first circularly polarized light and to partially reflect and transform the first circularly polarized light into a second circularly polarized light having a circular polarization direction different from that of the first circularly polarized light.

14. The pancake lens assembly according to claim 13, wherein said quarter waveplate is configured
- to transform the first circularly polarized light into a first linearly polarized light,
- to transform the first linearly polarized light into the first circularly polarized light,
- to transform the second circularly polarized light into a second linearly polarized light having a linear polarization direction different from that of the first linearly polarized light, and
- to transform the second linearly polarized light into the second circularly polarized light.

15. The pancake lens assembly according to claim 14, wherein
- the first linearly polarized light is converted, by said polarization controller in the first state, into the second linearly polarized light, and
- the second linearly polarized light is converted, by said polarization controller in the first state, into the first linearly polarized light.

16. The pancake lens assembly according to claim 15, wherein said reflective polarizer is configured to reflect the first linearly polarized light and to transmit the second linearly polarized light.

17. The pancake lens assembly according to claim 16, wherein
- the first circularly polarized light is a left circularly polarized light,
- the second circularly polarized light is a right circularly polarized light,
- the first linearly polarized light is an X-polarized light which is polarized in the X direction, and
- the second linearly polarized light is a Y-polarized light which is polarized in the Y direction.

* * * * *